US012669332B2

(12) United States Patent
Barrau et al.

(10) Patent No.: US 12,669,332 B2
(45) Date of Patent: Jun. 30, 2026

(54) NAVIGATION ASSISTANCE METHOD AND DEVICE BASED ON A KALMAN FILTER

(71) Applicants: SAFRAN, Paris (FR); Association Pour la Recherche et le Developpement des Methods et Processus Industriels-Armines, Paris (FR)

(72) Inventors: Axel Barrau, Moissy-Cramayel (FR); Colin Parellier, Moissy-Cramayel (FR); Silvère Bonnabel, Paris (FR)

(73) Assignees: SAFRAN, Paris (FR); Association Pour la Recherche et le Developpement des Methods et Processus Industriels-Armines, Paris (FR)

( * ) Notice: Subject to any disclaimer, the term of this patent is extended or adjusted under 35 U.S.C. 154(b) by 55 days.

(21) Appl. No.: 18/842,537

(22) PCT Filed: Feb. 27, 2023

(86) PCT No.: PCT/FR2023/050268
§ 371 (c)(1),
(2) Date: Aug. 29, 2024

(87) PCT Pub. No.: WO2023/166260
PCT Pub. Date: Sep. 7, 2023

(65) Prior Publication Data
US 2025/0180358 A1      Jun. 5, 2025

(30) Foreign Application Priority Data
Mar. 4, 2022     (FR) ........................................ 2201907

(51) Int. Cl.
*G01C 21/16*          (2006.01)
*G06F 7/544*          (2006.01)

(52) U.S. Cl.
CPC ......... *G01C 21/165* (2013.01); *G06F 7/5443* (2013.01)

(58) Field of Classification Search
CPC .... G01C 21/165; G01C 21/005; G01C 21/28; G06F 7/5443; G01S 19/45; G01S 19/47;
(Continued)

(56) References Cited

U.S. PATENT DOCUMENTS 10,579,068 B2 *    3/2020    Madsen ................... G01S 19/49
11,827,351 B2 *    11/2023    Karachalios ......... G06V 20/176
(Continued)

OTHER PUBLICATIONS

Eric Abbott et al., "Land-Vehicle Navigation using GPS", Feb. 1999, IEEE. (Year: 1999).*

(Continued)

*Primary Examiner* — Ashley L Redhead, Jr.
(74) *Attorney, Agent, or Firm* — Bookoff McAndrews, PLLC

(57) ABSTRACT

Method for monitoring the navigation of a vehicle for the implementation of a navigation maneuver, the method including the steps of: estimating a magnitude by a Kalman filter from parameters, a digital model of the vehicle in its environment, and at least one measurement made by at least one sensor and associated with an uncertainty on this measurement, the magnitude serving to implement the navigation maneuver; determining at least one partial derivative value of the magnitude with respect to the at least one measurement; obtaining at least one criticality value of the at least one measurement for the estimation, from the at least one partial derivative.

14 Claims, 6 Drawing Sheets

(58) Field of Classification Search
CPC ......... G01S 19/48; G01S 19/49; G05D 1/027; G05D 1/0278
See application file for complete search history.

(56) References Cited

U.S. PATENT DOCUMENTS

| | | | | |
|---|---|---|---|---|
| 2008/0228395 | A1* | 9/2008 | Kobori | G01S 5/011 701/8 |
| 2015/0354966 | A1* | 12/2015 | Morin | G01S 11/12 701/468 |
| 2016/0146616 | A1* | 5/2016 | Ren | G01C 21/165 701/409 |
| 2018/0095476 | A1* | 4/2018 | Madsen | A01B 69/001 |
| 2018/0136665 | A1* | 5/2018 | Mudalige | G05D 1/0077 |

OTHER PUBLICATIONS

Eric Abbott et al. "Land-Vehicle Navigation Using GPS" Proceedings of the IEEE, IEEE. New York, US, vol. 87, No. 1, Jan. 1, 1999 (Jan. 1, 1999), ISSN: 0018-9219, XP011044133.

Karkee M et al. "Local and global sensitivity analysis of a tractor and single axle grain cart dynamic system model" Biosystems Engineering, Elsevier, Amsterdam, NL, vol. 106, No. 4, Aug. 1, 2010 (Aug. 1, 2010), pp. 352-366, [retrieved on Jun. 2, 2010] ISSN: 1537-5110, XP027172903.

T. K. Lau, Y.-H. Liu and K. W. Lin, "Inertial-Based Localization for Unmanned Helicopters Against GNSS Outage," in IEEE Transactions on Aerospace and Electronic Systems, vol. 49, No. 3, pp. 1932-1949, Jul. 2013, doi: 10.1109/TAES.2013.6558029.

Search Report and Written Opinion issued in International Application No. PCT/FR2023/050268, mailed Jun. 16, 2023 (6 pages).

* cited by examiner

[Fig.1]
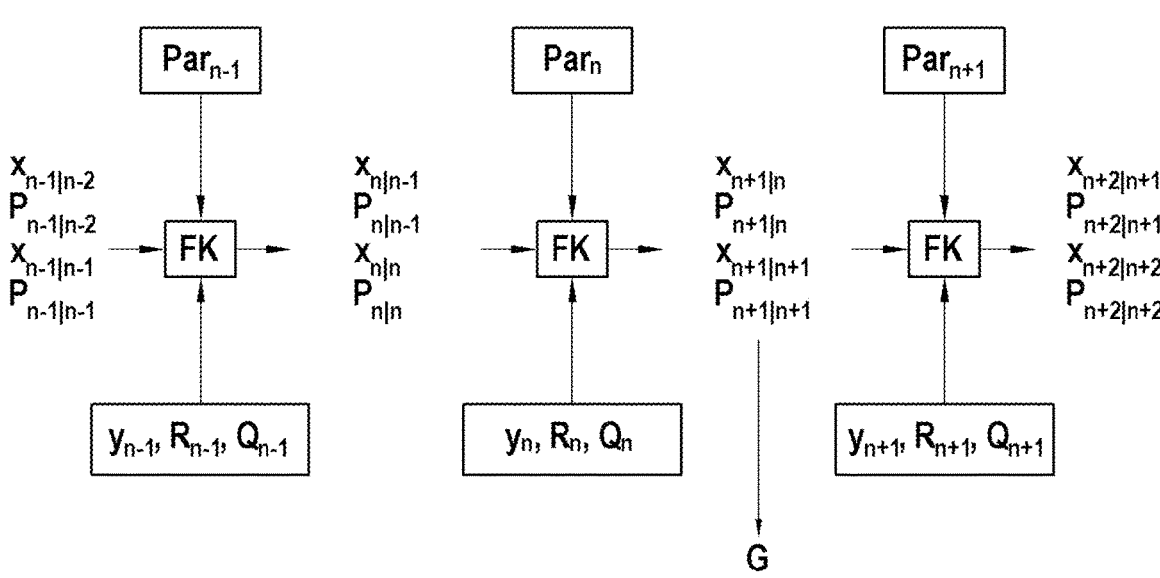

[Fig.2]
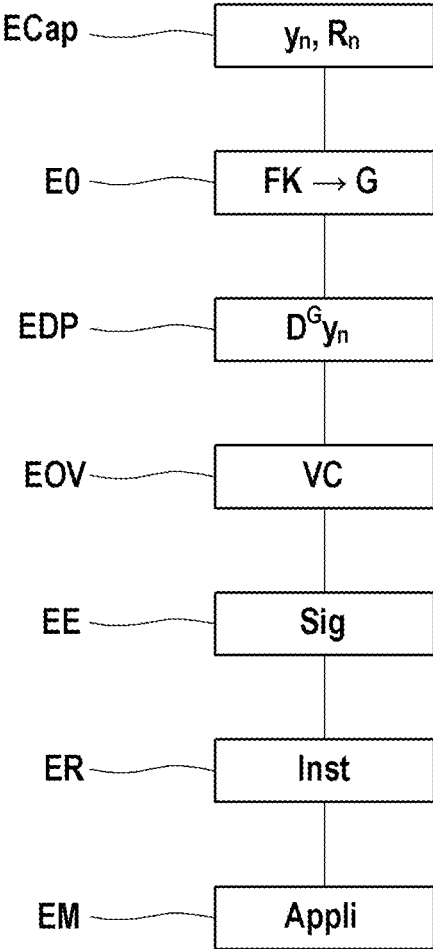

[Fig.3]
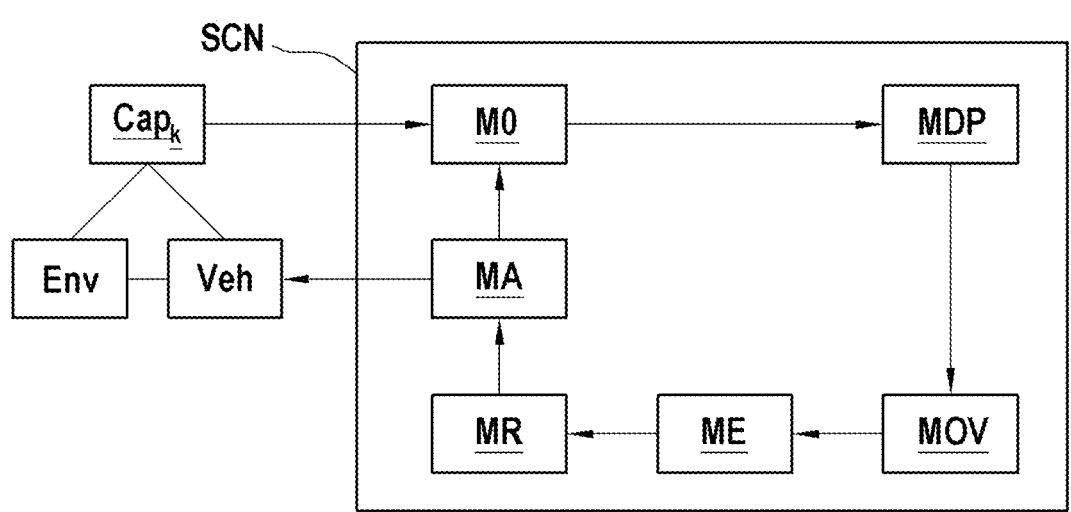

[Fig.4]
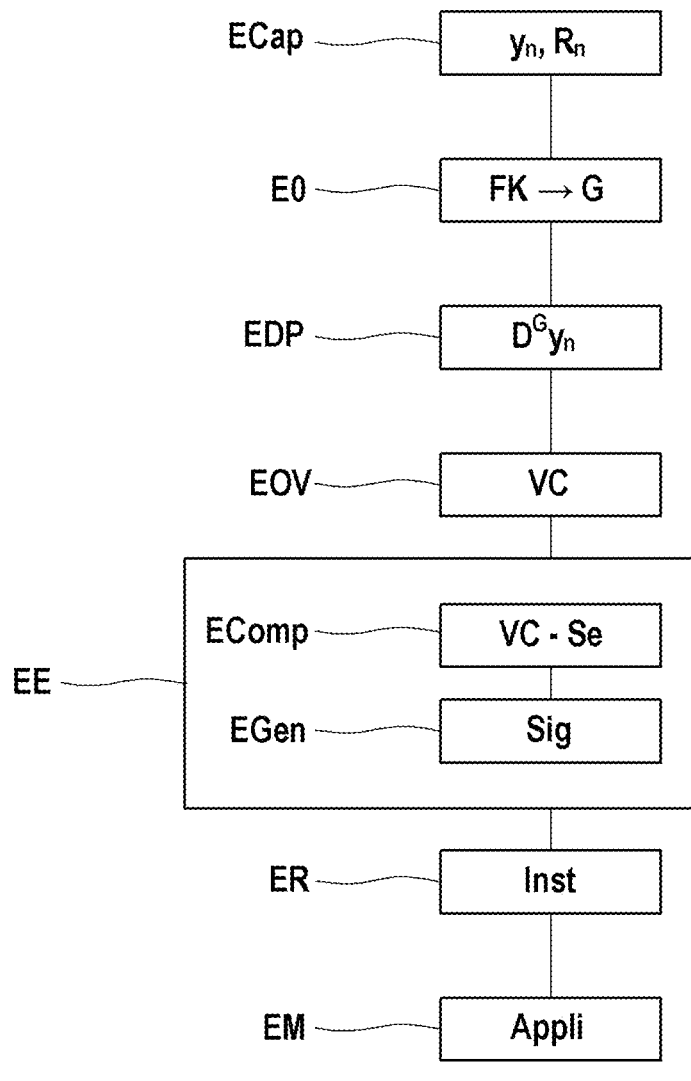

[Fig.5]
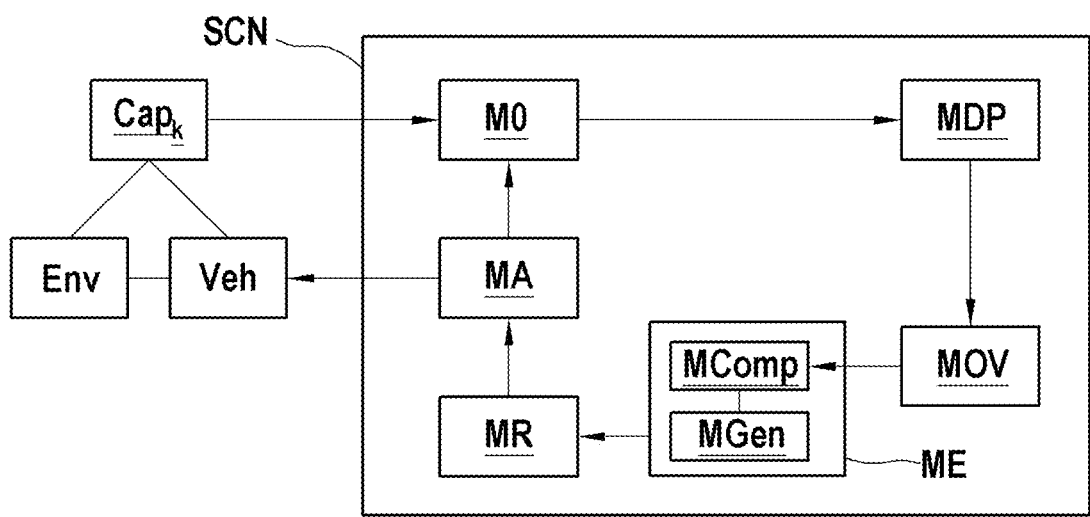
[Fig.6]
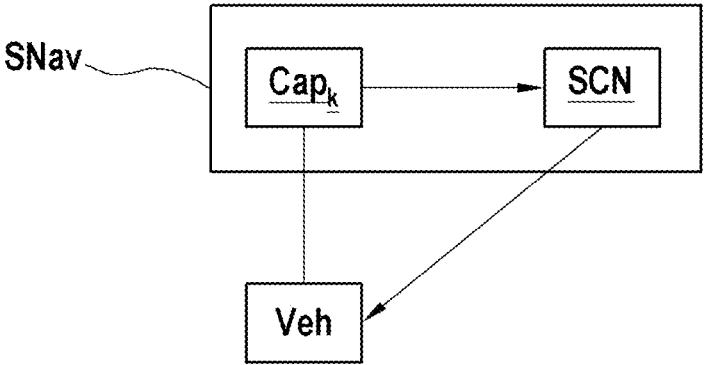

[Fig.7]
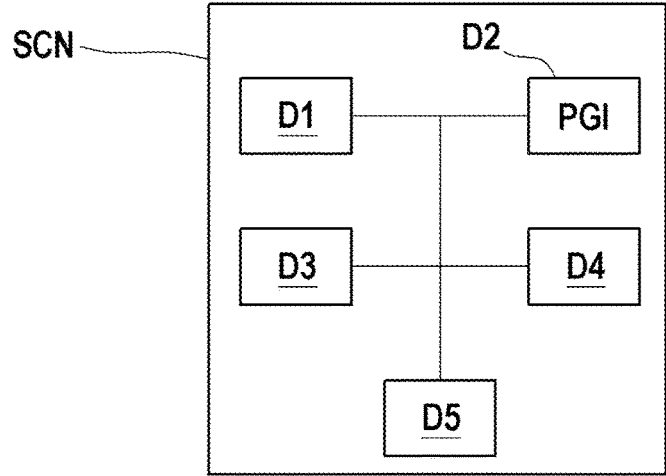
[Fig.8]
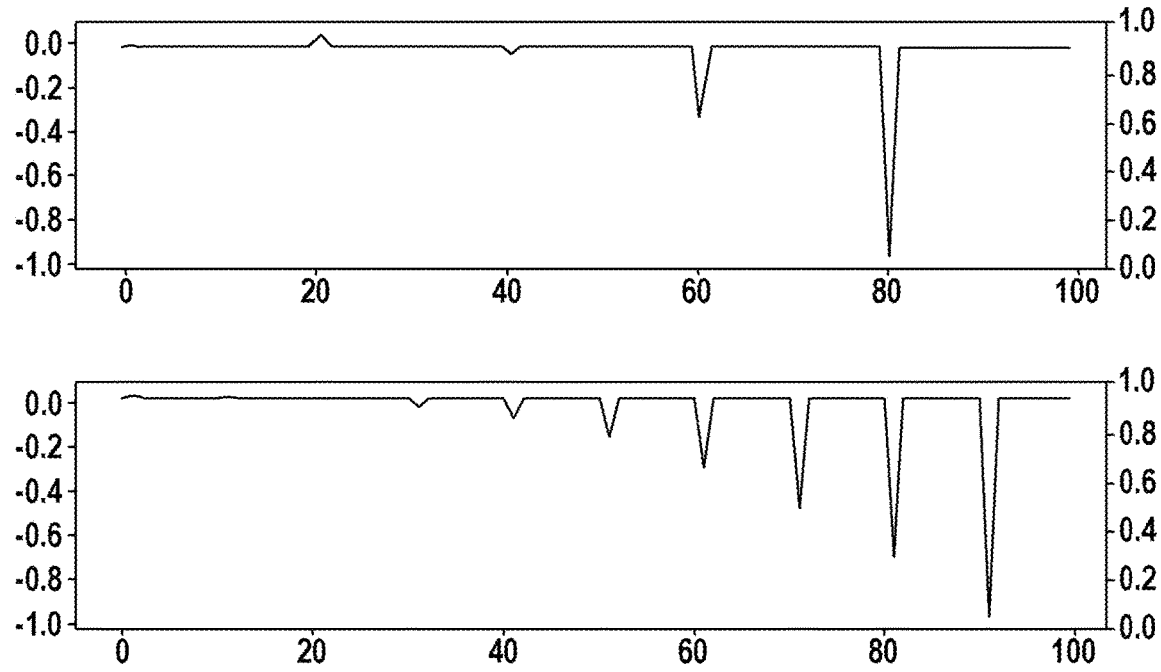

NAVIGATION ASSISTANCE METHOD AND DEVICE BASED ON A KALMAN FILTER

CROSS-REFERENCE TO RELATED APPLICATIONS

This is a National Stage Application under 35 U.S.C. § 371 of International Application No. PCT/FR2023/050268, filed Feb. 27, 2023, now published as WO 2023/166260 A1, which claims priority to French Patent Application No. 2201907, filed on Mar. 4, 2022.

PRIOR ART

The invention relates to the general field of measurements made using sensors, such as the position and the speed of a vehicle.

It more particularly concerns the monitoring of the navigation of a vehicle using a Kalman filter. This Kalman filter is used to estimate a magnitude necessary for the implementation of a maneuver of navigation of this vehicle. This magnitude represents for example a characteristic of the vehicle itself (e.g. the position, the speed, the orientation etc.), or can also represent a characteristic relating to the environment (the presence of an object in the vicinity of the vehicle, the wind speed etc.). Subsequently, such characteristics, whether internal or external to the vehicle, will be called "states".

Note that a Kalman filter also estimates uncertainties, in the form of covariance matrices, on the estimation of the states. These estimated uncertainties can also serve to implement a maneuver. The term "magnitude" could therefore also designate such uncertainties estimated by the Kalman filter.

As known, in a navigation system, a Kalman filter is frequently used as a state estimator. The Kalman filter evaluates the state $x_n$ recursively, at each instant n, from a numerical model (in particular a model describing how the different states evolve according to each other, and how the measurements depend on the states) and on information collected by sensors, hereinafter called "measurements".

For example, in a navigation system that generates an estimation of the position, the orientation and the speed of a target object, the model in particular comprises kinematic equations governing the trajectory of a vehicle according to its position, its orientation and its speed. The model can involve some parameters whose values are known a priori (e.g. the acceleration of gravity) and/or whose values may vary depending on the time step n.

In the remainder of the Application, to mention the temporalization n, the given expressions "moment", "step" and "instant" will be used interchangeably.

The time interval between two of these successive instants is generally a parameter adjustable by the user.

In the field of the navigation systems, the sensors are often associated with an inertial measurement unit.

For example, in navigation, it is common to use an inertial measurement unit coupled to a GPS receiver to estimate the position and the orientation of a vehicle. The inertial measurement unit, including gyroscopes and accelerometers, respectively evaluates the changes in orientation and the successive forces to which the mobile carrier is subjected. With a simple mathematical operation of integration, these measurements make it possible to estimate the state of the vehicle in terms of position, speed and orientation. The information communicated by GPS makes it possible to calculate the position of the vehicle. A Kalman filter merges this information to estimate the state of the vehicle. The quality of the merging is done, among other things, via good calibration of the filter parameters. The models and the data merging methods are known and will not be set out in more detail.

The magnitude(s) estimated by the Kalman filter, and the use of these estimations, vary depending on the application. In particular:

- the estimation relates for example to the state of the vehicle and the estimation can serve to update a road map displayed to the driver of the vehicle and/or to decide which directions will be given to him to reach the purpose of his trip;
- in a system equipped with radar sensors, the estimation can relate to the states of objects in the vicinity of the vehicle and this estimation can serve as an indication of the position of these objects so that the trajectory of the vehicle is adapted;
- in an autonomous vehicle, the estimation relates for example to the vehicle and can provide information to a control module which drives the vehicle allowing the latter to decide on the next maneuver, etc.

The Kalman filter recursively determines an estimation $x_{n|n}$ of the current state of the target object by using the previous estimation as well as the measurements provided by sensors up to instant n. This recursive calculation is illustrated schematically in FIG. 1.

Even with an appropriate mathematical model, the quality of the measurements provided by the sensor(s) has a significant influence on the quality of the estimations by the Kalman filter.

To appreciate this importance of the quality of the measurements, the classic operation of a Kalman filter should first be recalled.

The state estimated by the Kalman filter at a given step n will be noted $x_n$. In many applications, the state is expressed in terms of a plurality of variables and therefore $x_n$ constitutes a vector.

The system evolves according to the digital model and, therefore, it can be considered that the state $x_n$ of the target object at a given moment n depends on the state $x_{n-1}$ of the previous instant n−1 according to the equation [Math. 1] below:

$$x_n = F_n x_{n-1} + B_n u_n + w_n \qquad \text{[Math. 1]}$$

Where $F_n$ is a known square matrix, $U_n$ is a control input vector (known to the user), that is to say an action applied to the system, $B_n$ is the matrix representing the model that links the state $x_n$ to this control input, and $w_n$ is a centered Gaussian random variable representing a covariance noise represented by a matrix $Q_n$.

In the equation [Math. 1] and the following equations, the side-by-side notation of two quantities corresponds to:

- a simple product if these two quantities are numbers,
- a product of a matrix with a vector if one of these quantities is a matrix and the other quantity is a vector (for example $F_n x_{n-1}$ in the equation [Math. 1]), or
- a matrix product if these two quantities are matrices (for example $F_n P_{n-1|n-1}$ in the equation [Math. 4] below).

The measurement(s), in particular those delivered by the sensor(s), at instant n, will be noted $y_n$ and depend on the state $x_n$ according to the equation [Math. 2] below:

$$y_n = H_n x_n + v_n \qquad \text{[Math. 2]}$$

Where $H_n$ is a known observation matrix, and $v_n$ is a centered Gaussian random variable representing the covariance noise $R_n$. Again, in many applications, a plurality of measurements is delivered to the Kalman filter at each instant n and, in this case, $y_n$ and $v_n$ will be vectors and $R_a$ is a matrix.

During the practical implementation of a Kalman filter, it is necessary to choose the noise covariance matrices, $Q_n$ and $R_a$. Often this is done by studying beforehand how these covariances relate to the data obtained in the field in question. A typical approach to estimate the covariances consists in the application of the ALS (autocovariance least-squares) algorithm.

The noise covariance matrices $Q_n$ and $R_a$ correspond to uncertainties on the measurements made by the sensors. Thus, in the present application, and for the sake of brevity, these quantities will be referred to by the term uncertainty on the measurement $y_n$.

The Kalman filter maintains an estimation of the state $x_n$ at a given moment n, and this estimation will be noted $x_{n|n-1}$ when it is calculated (predicted) from the measurements $y_{n-1}$ available at moment n−1, and $x_{n|n}$ when the calculation integrates the measurements $y_n$ obtained at moment n. The Kalman filter also estimates a covariance matrix $P_n$ representative of the uncertainty of the estimation of the state $x_n$ and this matrix will be noted $P_{n|n-1}$ when it applies to the estimation $x_{n|n-1}$, and $P_{n|n}$ when it applies to the estimation $x_{n|n}$.

At each step n, the filter operates in two times.

Firstly, the Kalman filter predicts the estimation of the a priori state $x_{n|n-1}$ of the target object, as well as the covariance matrix $P_{n|n-1}$, from the estimation of the state $x_{n-1|n-1}$ and of the covariance matrix $P_{n-1|n-1}$, according to the equations [Math. 3] and [Math. 4] below:

$$x_{n|n-1} = F_n x_{n-1|n-1} + u_n \qquad \text{[Math. 3]}$$

$$P_{n|n-1} = F_n P_{n-1|n-1} F_n^T + Q_n \qquad \text{[Math. 4]}$$

Where $F_n^T$ is the transpose of the matrix $F_n$.

Secondly, the Kalman filter updates the a priori estimation of the state of the target object by using the prediction made in the previous step and taking into account the current measurements $y_n$ with a certain weighting represented by a coefficient $K_n$ called "Kalman gain". The update is done according to the equations [Math. 5] and [Math. 6] below:

$$x_{n|n} = x_{n|n-1} + K_n(y_n - H_n x_{n|n-1}) = x_{n|n-1} + K_n z_n \qquad \text{[Math. 5]}$$

$$P_{n|n} = (I - K_n H_n) P_{n|n-1} \qquad \text{[Math. 6]}$$

where $K_n$ is calculated according to the equation [Math. 7] below:

$$K_n = P_{n|n-1} H_n^T S_n^{-1} \qquad \text{[Math. 7]}$$

where $S_n$, which represents the covariance of the measurements $y_n$ is calculated according to the equation [Math. 8] below:

$$S_n = H_n P_{n|n-1} H_n^T + R_n \qquad \text{[Math. 8]}$$

$S_n^{-1}$ is the inverse matrix of $S_n$, and $z_n$ is defined according to the equation [Math. 9] below:

$$z_n = y_n - H_n x_{n|n-1} \qquad \text{[Math. 9]}$$

The Kalman filter outputs the current estimation $x_{n|n}$ in of the current state and the uncertainty $P_{n|n}$ in associated with this estimation, these magnitudes being delivered, depending on the application, to a control system or the like.

As long as the Kalman filter assumes that the measurements from the GPS are reliable, a measurement error, even small, will cause the estimation to deviate more or less significantly from the actual situation.

Thus, the data of the uncertainty values associated with an estimation is not sufficient to evaluate the reliability of the measurements and estimations by the Kalman filter, nor does it allow detecting which measurement or which sensor is responsible for a poor robustness of this estimation.

The invention aims to overcome these drawbacks.

DISCLOSURE OF THE INVENTION

Thus, and according to a first aspect, the invention proposes a method for monitoring the navigation of a vehicle for the implementation of a navigation maneuver, the method comprising the steps of:
- estimating a magnitude by a Kalman filter from parameters, a digital model of the vehicle in its environment, and at least one measurement made by at least one sensor and associated with an uncertainty on this measurement, said magnitude serving to implement said navigation maneuver;
- determining at least one partial derivative value of said magnitude with respect to said at least one measurement;
- obtaining at least one criticality value of said at least one measurement for said estimation, from said at least one partial derivative value;
- sending at least one criticality signal representative of said at least one criticality value;
- receiving at least one instruction in response to said sending step; and
- applying said at least one instruction;
a said instruction indicating a monitoring control for the implementation of said navigation maneuver.

Correlatively, the invention proposes a system for monitoring the navigation of a vehicle for the implementation of a navigation maneuver, the system comprising:
- a module for estimating a magnitude by a Kalman filter from parameters, a digital model of the vehicle in its environment, and at least one measurement made by at least one sensor and associated with an uncertainty on this measurement, said magnitude serving to implement said navigation maneuver;
- a module for determining at least one partial derivative value of said magnitude with respect to said at least one measurement;
- a module for obtaining at least one criticality value of said at least one measurement for said estimation, from said at least one partial derivative value;
- a module for sending at least one criticality signal representative of said at least one criticality value;
- a module for receiving at least one instruction in response to said sending step; and
- a module for applying said instruction;

a said instruction indicating a monitoring control for the implementation of said navigation maneuver.

According to one mode of implementation of the monitoring method, a said instruction indicates the addition of the measurements for a subsequent estimation of said magnitude.

It is specified here that the use of the term partial derivative here encompasses the notion of gradient. Indeed, a measurement or an uncertainty can contain several quantities (speed, position, etc.) and can therefore be represented in the form of a vector.

In this case, for the sake of brevity, the term partial derivative of the magnitude with respect to a quantity will also be used. In other words, in the present application, if a quantity is in the form of a vector, the partial derivative of the magnitude with respect to this quantity designates the gradient of this magnitude according to the vector representing the quantity.

Also for the sake of brevity, value of a partial derivative of the magnitude with respect to a measurement will refer to the set of values that comprises the gradient of the magnitude according to the vector representing this measurement.

It is also specified that in the present application, the value of a partial derivative of a magnitude with respect to a first matrix (for example a matrix representing uncertainties on a measurement) corresponds to a second matrix whose components are equal to the values of partial derivatives of this magnitude with respect to each of the components of the first matrix.

In the present application, if a sum between two vectors (for example two partial derivatives in the form of vectors) is invoked, this sum corresponds to a vector equal to the element-by-element sum of these two vectors.

The evaluation of these partial derivatives advantageously makes it possible to provide important information on the robustness of the estimation of a magnitude necessary for the implementation of a navigation maneuver, particularly by making it possible to quantify the criticality of the different measurements in this estimation.

The information obtained on the robustness of the estimation of the magnitude indicates whether or not it is relevant to add a measurement in order to estimate the magnitude, among all the available measurements, or to apply a monitoring control, which corresponds for example to the cancellation of the envisaged maneuver.

Indeed, on the one hand, one or more partial derivative(s) of a magnitude with respect to a measurement made at a given instant, or with respect to measurements made during a given time range, make(s) it possible to evaluate the influence of the measurements on the estimation of the magnitude over time.

For example, if a partial derivative with respect to a measurement takes a large value for the measurement made at the instant preceding the estimation of the magnitude, but takes values close to zero for the measurement made at the earlier instants, this means that only the measurement made at the instant preceding the estimation is taken into account significantly in this estimation.

This scenario may indicate a lack of robustness of the estimation, in the case where a robust estimation requires taking into account several successive measurements.

In this example, the estimation can be improved by increasing the frequency of the measurements taken overtime.

Thus, according to one mode of implementation of the monitoring method:

measurements made successively are obtained, and
during said determination step, for each of these measurements, a partial derivative value of the magnitude is determined with respect to this measurement.

In this embodiment, the calculation of partial derivatives is made a posteriori. In other words, the magnitude is obtained after obtaining the measurements with respect to which the partial derivative values of the magnitude are calculated.

For example, the partial derivatives of an estimation $x_{n|n}$ at the instant n are calculated with respect to the series of measurements taken into account between the instants 0 and n; thus, the calculation of these partial derivatives is made after obtaining the estimation $x_{n|n}$.

On the other hand, one or more partial derivative(s) of a magnitude with respect to a measurement made by a given sensor or with respect to measurements made by a set of given sensors, make(s) it possible to evaluate the influence of the sensor or of the set of sensors on the estimation.

For example, if a partial derivative with respect to a measurement takes a low value while the knowledge of those skilled in the art indicates that the estimated magnitude is generally very influenced by this measurement (for example, the estimation of the speed of a vehicle is very influenced by the measurement of its acceleration), then this indicates that the estimation is not robust.

According to one mode of implementation of the monitoring method, for at least a given instant, a said partial derivative value is determined during said determination step, with respect to a measurement, this measurement including at least two measurements each made by separate sensors at this given instant.

Recall that, as explained above, a measurement can correspond to a vector whose components are measurements of different states. For example, a said measurement at a given instant can for example include a measurement of the acceleration of the vehicle at that given instant as well as a measurement of the speed of the vehicle at that given instant.

It is also recalled that in this mode of implementation, a partial derivative of the magnitude with respect to this measurement is a vector whose components are equal to the partial derivatives of the magnitude with respect to each of the measurements of the different states. For example, the partial derivative of the magnitude with respect to an acceleration and speed measurement includes the partial derivative of the magnitude with respect to the speed measurement as well as the partial derivative of the magnitude with respect to the acceleration measurement.

The calculation of the partial derivatives of a magnitude estimated by a Kalman filter is, advantageously, inexpensive in terms of computing power and storage capacity.

The calculation of the partial derivatives of the estimated magnitude exploits some values which are already calculated during the operation of a Kalman filter as a state estimator. As a result, the implementation of the invention only requires the addition of a few additional means that are inexpensive in terms of time and computing power.

From the partial derivative values, the method makes it possible to obtain a criticality value to characterize the criticality of a measurement, for the estimation of the magnitude. In other words, a criticality value quantifies the influence of one or more measurement(s) on the estimation of the magnitude. In a first example, one or more criticality value(s) can be equal to the partial derivative values, given that these values make it possible to characterize the criticality of measurements for the estimation of the magnitude.

Thus, according to one mode of implementation of the monitoring method, the at least one criticality value is equal to the at least one partial derivative value determined during said determination step.

Particularly in the case of a system equipped with a single sensor which only gives one measurement at a time, the partial derivatives of the magnitude with respect to the measurements made over time by this single sensor make it possible to estimate the robustness of the estimation of the magnitude.

However, depending on the navigation maneuver to be carried out, it may be advantageous to define the criticality value(s) differently.

For example, according to one particular mode of the monitoring method, the criticality value(s) are equal to the absolute values of the partial derivative values.

Indeed, depending on the navigation maneuver to be implemented, the amplitude of the criticality of a measurement on the estimation of the magnitude, quantified by the absolute value of the partial derivative with respect to this measurement, is relevant.

In another example, the criticality values are equal to the absolute values of the normalized partial derivative values, such that the sum of these criticality values is equal to 1.

The normalization of the absolute values of the partial derived values with respect to different measurements makes it possible in particular to compare the criticality of a measurement for the estimation of a magnitude, relative to the criticalities of the other measurements used for this same estimation.

In another example where several partial derivative values are determined with respect to measurements taken successively over time, the criticality values are equal to differences of two partial derivative values with respect to two measurements made successively. Such criticality values make it possible to detect a possibly too large variation, at a given instant, in the criticality of a measurement for the estimation of the magnitude, and thus to detect poor robustness of the estimation at this given instant.

It may be advantageous to characterize the criticality of a group of measurements for the estimation of the magnitude, for example measurements taken successively during a given time range, or measurements taken by a group of sensors.

For this purpose, a criticality value can be equal to a sum over the values of partial derivatives with respect to the measurements among a group of measurements.

Thus, according to one particular embodiment of the monitoring method:

several partial derivative values are determined during said determination step, said at least one criticality value is equal to a sum of said partial derivative values.

According to another embodiment of the monitoring method:

several partial derivative values are determined during said determination step, said at least one criticality value is equal to a sum of products between:

(i) a said partial derivative value with respect to a said measurement, and (ii) said uncertainty on this measurement.

In other words, in this mode of implementation, a criticality value is a sum of partial derivative values with respect to measurements, this sum being weighted by the uncertainties on these measurements.

This embodiment advantageously makes it possible, and in a simple manner, to detect whether uncertain measurements have a high criticality for the estimation of the magnitude. If such a criticality value is high, this means that the estimation of the magnitude is not robust.

The invention also makes it possible to determine a criticality value similarly to the previous embodiment, from a single partial derivative value.

Thus, according to one embodiment of the monitoring method, said at least one criticality value is equal to a product between:

(i) a said partial derivative value with respect to a said measurement, and (ii) said uncertainty on this measurement.

In order to allow the use of the criticality value(s), the monitoring method indicates the sending of one or more criticality signal(s) representative of these criticality values. In the navigation monitoring system allowing the implementation of the method described above, this/these criticality signal(s) is/are sent to a receiving module which makes it possible to implement the receiving step of the method.

By construction, this/these criticality signal(s) contain(s) one or more piece(s) of information on the robustness of the estimation of the magnitude, this information making it possible to make a decision with respect to the implementation of the navigation maneuver.

In one embodiment of the invention, the criticality signal(s) include values equal to the criticality values.

In another embodiment, the criticality signal(s) can be defined from the comparison of the criticality values with one or more threshold(s).

Thus, according to one particular mode of implementation of the monitoring method, the sending step includes the sub-steps of:

comparing between said at least one criticality value and at least one threshold, said at least one threshold being defined with respect to said maneuver;

generating said at least one criticality signal as a function of a result of said comparison.

Correlatively, the invention proposes one particular embodiment of the monitoring system in which said sending module includes the submodules for:

comparing between said at least one criticality value and at least one threshold, said at least one threshold being defined with respect to said maneuver;

generating said at least one criticality signal as a function of a result of the comparison by said comparison submodule.

In this particular mode of implementation, the knowledge by those skilled in the art of the navigation maneuver to be implemented, in particular of the operation of the sensors making the measurements, makes it possible to define one or more threshold(s).

The criticality signal(s) resulting from the comparison of the criticality value(s) with this/these threshold(s) has/have the advantage of being easily readable indicators of the robustness of the estimation of the magnitude.

In particular, such a criticality signal can be a binary number, indicating the good or poor robustness of the estimation.

The criticality signal(s) can be processed automatically or processed by a user to whom the criticality signal(s) is/are presented, via this receiving module.

Subsequently, one or more instruction(s) for example determined automatically or by the user, is/are received by the receiving module, then applied. For example, the instruction(s) is/are determined as a function of the criticality signal(s).

An instruction can concern a monitoring of the vehicle itself. In particular, if poor robustness of the estimation of the magnitude is detected, the instruction can indicate a temporary stopping of the implementation of the navigation maneuver or the cancellation thereof.

Such a temporary stopping of the navigation maneuver makes it possible in particular to ensure the navigation safety, until a more robust estimation of the magnitude is obtained.

If, on the other hand, good robustness of the estimation of the magnitude is detected, an instruction can indicate the extension of the maneuver.

An instruction can also indicate, in one particular embodiment, that it is desirable to take into account one or more additional measurement(s) among all the available measurements provided by the sensors, in order to perform a more robust estimation of the magnitude.

The invention also proposes a navigation system for a vehicle, said navigation system being adapted to perform the functions of the monitoring system according to one of the embodiments described above, and comprising at least one sensor intended to obtain at least one measurement serving to estimate a magnitude, said magnitude serving to implement a navigation maneuver.

According to one embodiment of this navigation system, at least one said sensor is an inertial measurement unit.

In such a system, the set of sensors can for example include at least one GPS sensor associated with an inertial measurement unit. This is a configuration of sensors that are usually on board a vehicle, drone or the like.

The invention proposes a computer program including instructions for the execution of the steps of a monitoring method according to any one of the implementation modes described above.

It should be noted that the computer programs mentioned in the present disclosure can use any programming language, and be in the form of source code, object code or intermediate code between source code and object code, such as in partially compiled form, or in any other desirable form.

The invention proposes a recording medium, readable by computer equipment of a computer program including instructions for the execution of the steps of a method according to any of the embodiments described above.

The recording media mentioned in the present disclosure may be any entity or device capable of storing the program and of being read by a control apparatus or by any computer equipment, in particular a computer.

For example, the medium can include a storage means, or a magnetic recording means, for example a hard disk.

Alternatively, the recording media can correspond to a circuit integrated into a computer or a navigation system, circuit in which the program is incorporated, and adapted to execute a method as described above or to be used in the execution of this method.

BRIEF DESCRIPTION OF THE DRAWINGS

Other characteristics and advantages of the present invention will emerge from the description given below, with reference to the appended drawings which illustrate exemplary embodiments devoid of any limitation. In the figures:

FIG. 1 schematically represents the recursive operation of a Kalman filter;

FIG. 2 represents a navigation monitoring method in accordance with a first particular mode of implementation of the invention;

FIG. 3 represents a navigation monitoring system in accordance with a first particular mode of implementation of the invention;

FIG. 4 represents a navigation monitoring method in accordance with a second particular mode of implementation of the invention;

FIG. 5 represents a navigation monitoring system in accordance with a second particular mode of implementation of the invention;

FIG. 6 represents a navigation system in accordance with a particular mode of implementation of the invention;

FIG. 7 represents the hardware architecture of a navigation monitoring system according to one particular mode of implementation of the invention;

FIG. 8 represents partial derivative values with respect to measurements made successively, for two different time intervals between the successive measurements.

DESCRIPTION OF THE EMBODIMENTS

Several embodiments of the invention will now be described. Generally, and as mentioned previously, the invention proposes a method for monitoring the navigation of a vehicle Veh for the implementation of a maneuver requiring the estimation of a magnitude G.

FIG. 1 represents the iterative process for estimating a magnitude G at each instant n by a Kalman filter FK.

This magnitude, at instant n, is for example the value $x_{n|n}$ of a state estimated by the Kalman filter FK, or of an uncertainty $P_{n|n}$ in on the estimation of this state. Generally, this magnitude can correspond to any quantity estimated by the Kalman filter FK, and required for the implementation of a navigation maneuver $Man_j$.

At a given instant n, the Kalman filter uses the parameters $Par_n$ corresponding to a digital model of the vehicle in its environment, to estimate quantities including magnitude, from quantities estimated by this Kalman filter at the previous instant n–1.

Note that in FIG. 1, the estimation of the magnitude at instant n also uses measurements $y_n$ (and the uncertainties $R_n$ and $Q_n$ on these measurements) made at instant n. Particularly, the estimation of this magnitude takes into account: a first estimation made without taking into account the measurements at instant n, then an update of this estimation with the measurements $y_n$ and their uncertainties $R_n$.

The first estimation is a prediction from instant n–1, since it does not require observation of the vehicle and/or its environment at instant n.

If the magnitude corresponds to a state, the first estimation corresponds to the equation [Math. 3] which gives a first estimated value $x_{n|n-1}$ of the state, and the update corresponds to the equation [Math. 5] which gives a value $x_{n|n}$ of the state.

In another example, the magnitude G at instant n does not take into account the measurements made at instant n, and is therefore predicted from the measurements n–1. In this example, if the magnitude G corresponds to a state, its estimation corresponds to the first estimation of the value $x_{n|n-1}$.

Such an estimation is useful in a case where the navigation maneuver $Man_j$ requires the prediction of the magnitude G at instant n even before obtaining the measurements at instant n.

Note that the parameters $Par_{n-1}$, $Par_n$, $Par_{n+1}$ of the digital model can be modified between two successive instants.

FIG. 2 represents the main steps of a navigation monitoring method intended to improve the safety of the implementation of a navigation maneuver $Man_j$ of a vehicle Veh, in accordance with one particular embodiment of the 'invention.

During a step ECap, measurements $y_1$-$y_n$ and their associated uncertainties $R_1$-$R_n$ are obtained up to instant n via one or more sensor(s) $Cap^1$-$Cap^k$.

During an estimation step E0, a magnitude G is estimated by the Kalman filter from these measurements $y_1$-$y_n$ and uncertainties $R_1$-$R_n$. The estimation of this magnitude is made iteratively, as represented in FIG. 1 and explained above.

In one particular mode of implementation, this estimation of the magnitude corresponds to a first estimation of the magnitude without taking into account the measurements at instant n followed by an update of this first estimation with the measurements at instant n. In this mode, the estimation step corresponds to the estimation of the magnitude at magnitude n.

In another mode of implementation, the step of estimating the magnitude comprises the first estimation of the magnitude, followed by its update by the measurements $y_n$ and uncertainties $R_n$, then by an estimation of the magnitude at instant n+1, from the updated estimation of the magnitude at instant n. In this mode, the estimation step corresponds to the prediction of the magnitude at instant n+1.

During a step EDP, partial derivative values of the magnitude G with respect to the measurements are calculated.

In one embodiment, to calculate the values of partial derivatives with respect to the measurements made at instants preceding n, the backpropagation technique is used. This technique allows calculating the partial derivatives iteratively.

Particularly, it makes it possible to calculate a partial derivative of the magnitude with respect to a measurement $y_{n-1}$ at instant n−1 as a function of the partial derivative of the magnitude with respect to a measurement at instant n, then calculate a partial derivative of the magnitude with respect to a measurement at instant n−2 as a function of the partial derivative of the magnitude with respect to the measurement at instant n−1, and so on.

In order to calculate the partial derivative of the magnitude G with respect to a measurement made at any instant, the backpropagation requires combining:

on the one hand the formulas of the partial derivatives of the magnitude G with respect to the measurements of instant n:

$$\frac{\partial G}{\partial y_n} = K_n^T \frac{\partial G}{\partial x_{n|n}} \qquad \text{[Math. 10]}$$

on the other hand the formulas of the partial derivatives with respect to the quantities estimated by the Kalman filter at the previous instant n:

$$\frac{\partial G}{\partial P_{n|n-1}} = \qquad \text{[Math. 11]}$$

$$(I - K_n H_n)^T \left[ \frac{\partial G}{\partial P_{n|n}} + \frac{1}{2} \frac{\partial G}{\partial x_{n|n}} z_n^T R_n^{-1} H_n + \frac{1}{2} H_n^T R_n^{-1} z_n \left( \frac{\partial G}{\partial x_{n|n}} \right)^T \right]$$

-continued $$(I - K_n H_n)$$

$$\frac{\partial G}{\partial x_{n|n-1}} = (I - K_n H_n)^T \frac{\partial G}{\partial x_{n|n}} \qquad \text{[Math. 12]}$$

$$\frac{\partial G}{\partial P_{n-1|n-1}} = F_n^T \frac{\partial G}{\partial P_{n|n-1}} F_n \qquad \text{[Math. 13]}$$

$$\frac{\partial G}{\partial x_{n-1|n-1}} = F_n^T \frac{\partial G}{\partial x_{n|n-1}} \qquad \text{[Math. 14]}$$

Where the quantities appearing in these equations have been described previously.

Thus, by way of example, to calculate the partial derivative with respect to the measurements $y_{n-1}$ made at instant n−1, we obtain on the one hand, according to the equation [Math. 10]:

$$\frac{\partial G}{\partial y_{n-1}} = K_{n-1}^T \frac{\partial G}{\partial x_{n-1|n-1}} \qquad \text{[Math. 15]}$$

And on the other hand, according to the equations [Math. 14] and [Math. 12]:

$$\frac{\partial G}{\partial x_{n-1|n-1}} = F_n^T \frac{\partial G}{\partial x_{n|n-1}} = F_n^T (I - K_n H_n)^T \frac{\partial G}{\partial x_{n|n}} \qquad \text{[Math. 16]}$$

If for example the magnitude G is the state $x_{n|n}$ estimated at instant n, then we obtain, by combining [Math. 15] and [Math. 16]:

$$\frac{\partial G}{\partial y_{n-1}} = K_{n-1}^T F_n^T (I - K_n H_n)^T \qquad \text{[Math. 17]}$$

To calculate the partial derivative with respect to the measurements $y_{n-2}$ at instant n−2, the same method is used, but by replacing the n of the previous equations by n−1:

$$\frac{\partial G}{\partial y_{n-2}} = K_{n-2}^T \frac{\partial G}{\partial x_{n-2|n-2}} = K_{n-2}^T F_{n-1}^T (I - K_{n-1} H_{n-1})^T \frac{\partial G}{\partial x_{n-1|n-1}} \qquad \text{[Math. 18]}$$

Where the quantity $\partial G / \partial x_{n-1|n-1}$ has been calculated previously and therefore does not need to be recalculated.

If we continue the example in which G corresponds to the state $x_{n|n}$ estimated at instant n, we finally obtain, by using the result of the previous iteration:

$$\frac{\partial G}{\partial y_{n-2}} = K_{n-2}^T F_{n-1}^T (I - K_{n-1} H_{n-1})^T F_n^T (I - K_n H_n)^T \qquad \text{[Math. 21]}$$

The calculation of partial derivatives of the magnitude G with respect to the measurements $y_1$-$y_n$ is quite easy from the point of view of the computational load and the storage of the magnitudes during the estimation process, since:

The matrix operations are not numerous;

The dimensions remain limited to the dimensions of matrices whose maximum dimensions are equal to the number of elements in the state vectors $x_{n|n}$ or to the number of elements in the measurement vectors $y_n$;

the terms calculated for an iteration n, for example I-K$_n$H$_a$, can be stored and reused for the calculation of a partial derivative with respect to an element of an iteration preceding n;

the storage needs during the estimation process using the Kalman filter FK can be limited to the three quantities below:

(i) (I-K$_n$H$_n$), or K$_n$ and H$_n$, or K$_n$ and H$_n$ (ii) R$_n$ or S$_n$ (iii) z$_a$, H$_n$ and F$_n$.

It is recalled that a measurement y$_n$ made at a given instant n can be a vector. Each of the components y$_n^k$ of this vector being itself a measurement made by a sensor Cap$^k$ at this given instant n.

Thus, according to one embodiment in accordance with the invention, a measurement y$_n$ includes several measurements $$y_n^1 - y_n^k,$$

each of these measurements being made by a separate sensor Cap$_1$-Cap$^k$.

During a step EOV, one or more criticality value(s) VC is/are determined from these partial derivative values D$^G$y$_1$-D$^G$y$_n$.

In one particular mode of implementation of the invention, the criticality values VC are equal, for a given maneuver Man$_j$, to the partial derivative values D$^G$y$_1$-D$^G$y$_n$ determined during the step EDP.

One particular example of maneuver Man$_j$ is to take a ship across a sea strait, and the magnitude necessary for the implementation of this maneuver is a position of the ship with respect to the land coasts.

The measurements y$_n$ include for example acceleration measurements by a first sensor (an inertial measurement unit for example), and position measurements by a second sensor (a GPS for example), at a given instant n.

The partial derivative values D$^G$y$_n$, and therefore the criticality values VC in this example, quantify the influence of each of the measurements, at each instant n, on the estimation of the position of the ship.

Such an example is illustrated in FIG. 8. This figure represents the values of the partial derivatives of the magnitude G, with respect to the measurements made successively overtime, over a period of 100 seconds (on the abscissa). In this example, the measurements are speed measurements and the magnitude G is the estimation of the speed at instant 100.

At the top of FIG. 8, the time interval between two measurements is 20 seconds: we therefore see the value of a partial derivative every 20 seconds. At the bottom of FIG. 8, the time interval is 10 seconds.

FIG. 8 shows that in this particular case, the greater the time interval between two successive measurements, the more critical the last measurement is for the estimation of the magnitude.

Indeed, at the top of FIG. 8, it is observed that the last partial derivative value is three times larger in absolute value than the penultimate partial derivative value, and more than twenty times larger than the previous values of partial derivatives. Conversely, at the bottom of the figure, where the time interval between two measurements is twice as low, the gap between the values of partial derivatives with respect to two successive measurements is much smaller.

Thus, at the top of FIG. 8, only the last measurement is critical for the estimation of said magnitude. In other words, in this case, the estimation of the magnitude is essentially based on the last measurement. Depending on the maneuver to be carried out, this may mean that the estimation of the magnitude is not very robust in this case.

As shown at the bottom of FIG. 8, if the time interval between two successive measurements is reduced, several measurements significantly influence the estimation of the magnitude, which no longer relies solely on a single measurement. Depending on the maneuver to be carried out, this may mean that the estimation of the magnitude is more robust if the time interval between two measurements is reduced.

In another particular mode of implementation of the invention, the criticality value(s) is/are equal to the absolute values of the partial derivative values.

In another particular mode of implementation of the invention, the criticality values are equal to the absolute values of the normalized partial derivative values, such that the sum of these criticality values is equal to 1.

In another particular mode of implementation of the invention in which several values of partial derivatives are determined with respect to measurements taken successively overtime, the criticality values are equal to differences of two values of partial derivatives with respect to two measurements taken successively. Such criticality values make it possible to detect a possibly too large variation, at a given instant, in the criticality of a measurement for the estimation of the magnitude, and thus to detect poor robustness of the estimation at this given instant.

In another particular mode of implementation of the invention, the criticality values are sums over partial derivative values.

For example, a criticality value is the sum of the measurements made by a sensor over a given time interval. This quantifies the influence of the measurements of this sensor on the estimation of the magnitude, during this time interval.

In another example, a criticality value is the sum of the measurements made by all the sensors, at a given instant. Such a criticality value quantifies the influence of a set of measurements on the estimation of the magnitude, at this given instant.

In another particular mode of implementation of the invention, the criticality values are sums over values of partial derivatives with respect to measurements, weighted by uncertainties on these measurements in order to homogenize (make without unit) the partial derivatives. Such criticality values can be calculated with the formula:

or the formula:

$$VC = \sum_{i=m}^{n} R_i \frac{\partial G}{\partial y_i} \qquad \text{[Math. 20]}$$

$$VC = \sum_{i=m}^{n} Q_i \frac{\partial G}{\partial y_i} \qquad \text{[Math. 21]}$$

where m is an instant preceding the instant n, or is the instant n itself, in which case the sum of the equation [Math. 20] or of the equation [Math. 21] only comprises a single term.

Such criticality values quantify the influence of the measurements on the estimation of the magnitude G, relative to the uncertainties on these measurements.

During the sending step EE, one or more criticality signal(s) Sig is/are obtained from the criticality values determined during the step EDP. These signals are representative of the criticality values. In other words, they contain the information on the influence of the measurements quantified by the criticality values.

During this same step EE, this/these criticality signal(s) is/are sent to a receiving module.

In one particular embodiment of the invention, the criticality signals are values identical to the criticality values.

In another particular embodiment of the invention, represented in FIG. 4, the criticality signal(s) is/are obtained by a comparison between the criticality values VC and the thresholds Se, during a sub-step EComp of the sending step EE, then generated from the result of this comparison during a sub-step EGen of the sending step.

For example, if a criticality value VC is greater than a given threshold Se, the criticality signal Sig indicates a safety alert for the implementation of the maneuver $Man_j$ requiring the estimation of the magnitude. If, conversely, this criticality value VC is lower than this threshold Se, the criticality signal Sig indicates that the estimation is robust.

FIG. 5 represents a navigation monitoring system SCN in accordance with one embodiment of the invention, this system making it possible to implement the embodiment of the monitoring method represented in FIG. 4. Thus, the system SCN represented in FIG. 5 differs from the system SCN represented in FIG. 3 only by the presence of the comparison MComp and generation MGen submodules in the sending module ME, these submodules making it possible to implement the comparison EComp and generation EGen substeps of criticality signals Sig represented in FIG. 4.

The criticality signal Sig is then sent to a receiving module MR, then analyzed by a user having access to the receiving module MR. This user in return sends an instruction Inst to the receiving module MR. This instruction Inst is then applied, during an application step EA, by an application module MA. In another embodiment, the analysis of the criticality signal and the determination of the instruction can be processed automatically.

The instruction Inst can correspond to a monitoring control to be applied to the vehicle. For example, if the user deduces from the criticality signal(s) Sig that the estimation of the magnitude G is not robust, he can send the instruction Inst to stop the vehicle Veh or to pause the maneuver $Man_j$ until a robust estimation of the magnitude G is obtained.

The instruction Inst can also correspond to taking into account at least one additional measurement $y_1$-$y_n$ among all the available measurements made by at least one sensor $Cap^1$-$Cap^k$ associated with an uncertainty $R_n$ or $Q_n$ in order to improve the robustness of the estimation of the magnitude G of the state of the vehicle Veh.

The particular modes of implementation of the navigation monitoring method represented in FIG. 2 and FIG. 4 are implemented on navigation monitoring systems SCN represented respectively in FIG. 3 and FIG. 5.

In FIG. 3, sensors $Cap^k$ take measurements on the vehicle Veh and its environment Env. For example, a GPS can measure the position of the vehicle Veh, an inertial measurement unit can measure the speed and position of the vehicle, a radar can measure the position of objects in the vicinity of the vehicle etc.

These measurements and the uncertainties associated therewith are used by an estimation module MO to estimate a magnitude G with a Kalman filter FK.

A module MDP then determines the partial derivatives of the magnitude with respect to the measurements.

From the partial derivative values determined by the module MDP, a module MOV obtains one or more criticality value(s) as described previously.

A module ME then sends one or more criticality signal(s) Sig representative of these criticality values VC to a receiving module MR.

This module MR makes it possible to display the criticality signal(s) to a user who decides on an instruction as described previously.

This instruction is received by this module MR then applied by an application module MA.

If this instruction indicates a navigation monitoring control, it is applied to the vehicle Veh. If it indicates to take into account more measurements, a new estimation of the target state is made.

FIG. 6 represents a navigation system SNav integrating a navigation monitoring system SCN and a set of sensors $Cap^1$-$Cap^k$.

In one particular embodiment of this system Nav, this set of sensors $Cap^1$-$Cap^k$ includes at least one inertial measurement unit.

FIG. 7 represents the hardware architecture of a navigation monitoring system SCN in accordance with one particular embodiment of the invention.

In the embodiment described here, the navigation monitoring system SCN has a hardware architecture of a computer. It comprises in particular a processor D1, a read only memory D2, a random access memory D3, a rewritable non-volatile memory D4 and communication means D5.

The read-only memory D2 of the system SCN constitutes a recording medium in accordance with the invention, readable by the processor D1 and on which a computer program PGI in accordance with the invention is recorded, this program including instructions for the execution of the steps of a monitoring method according to the invention described previously with reference to FIG. 2 or FIG. 4 in two embodiments.

The computer program PGI defines functional modules of the monitoring systems SCN represented in FIG. 3 or FIG. 5.

The invention claimed is:

1. A method for monitoring a navigation of a vehicle for an implementation of a navigation maneuver, the method comprising the steps of:

estimating a magnitude by a Kalman filter from parameters, a digital model of the vehicle in its environment, and at least one measurement made by at least one sensor and associated with an uncertainty on this measurement, said magnitude serving to implement said navigation maneuver;

determining at least one partial derivative value of said magnitude with respect to said at least one measurement;

obtaining at least one criticality value of said at least one measurement for said estimation, from said at least one partial derivative value, the criticality value quantifying an influence of said at least one measurement on the estimation of the magnitude;

applying at least one instruction determined from at least one piece of information on a robustness of the estimation of the magnitude, said information being contained in at least one criticality signal representative of said at least one criticality value;

said instruction indicating a monitoring control for the implementation of said navigation maneuver, said at least one criticality signal being generated as a function of a result of a comparison between said at least one criticality value and at least one threshold, said at least one threshold being defined with respect to said maneuver.

2. The method according to claim 1, wherein a said instruction indicates an addition of the measurements for a subsequent estimation of said magnitude.

3. The method according to claim 1, wherein:

measurements made successively are obtained; and during said determination step, for each of these measurements, a partial derivative value of said magnitude is determined with respect to this measurement.

4. The method according to claim 1, wherein, for at least a given instant, a said partial derivative value is determined during said determination step, with respect to a measurement, this measurement including at least two measurements each made at this given instant by separate sensors.

5. The method according to claim 1, wherein said at least one criticality signal is generated as a function of a result of a comparison between said at least one criticality value and at least one threshold, said at least one threshold being defined with respect to said maneuver.

6. The method according to claim 1, wherein said at least one criticality value is equal to said at least one partial derivative value determined during said determination step.

7. The method according to claim 1, wherein:

several partial derivative values are determined during said determination step; and said at least one criticality value is equal to a weighted sum of said partial derivative values.

8. The method according to claim 1, wherein:

several partial derivative values are determined during said determination step;

said at least one criticality value is equal to a sum of products between:

(i) a said partial derivative value with respect to a said measurement; and (ii) said uncertainty on this measurement.

9. The method according to claim 1, wherein said at least one criticality value is equal to a product between:

(i) a said partial derivative value with respect to a said measurement; and (ii) said uncertainty on this measurement.

10. A non-transitory computer readable medium having stored thereon instructions which, when executed by a processor, cause the processor to implement the method of claim 1.

11. A system for monitoring a navigation of a vehicle for an implementation of a navigation maneuver, the system comprising:

a module for estimating a magnitude by a Kalman filter from parameters, a digital model of the vehicle in its environment, and at least a measurement made by at least one sensor and associated with an uncertainty on this measurement, said magnitude serving to implement said navigation maneuver;

a module for determining at least one partial derivative value of said magnitude with respect to said at least one measurement;

a module for obtaining at least one criticality value of said at least one measurement for said estimation, from said at least one partial derivative value, the criticality value quantifying an influence of said at least one measurement on the estimation of the magnitude;

a module for applying at least one instruction determined from at least one information on a robustness of the estimation of the magnitude, said information being contained in at least one criticality signal representative of said at least one criticality value;

said instruction indicating a monitoring control for the implementation of said navigation maneuver, said at least one criticality signal being generated as a function of a result of a comparison between said at least one criticality value and at least one threshold, said at least one threshold being defined with respect to said maneuver.

12. A monitoring system according to claim 11 wherein said sending module includes submodules for:

comparing between said at least one criticality value and at least one threshold, said at least one threshold being defined with respect to said maneuver;

generating said at least one criticality signal as a function of a result of a comparison by said comparison submodule.

13. A navigation system for a vehicle, said navigation system being adapted to perform functions of the monitoring system according to claim 11 and comprising at least one sensor intended to obtain at least one measurement serving to estimate a magnitude (G), said magnitude serving to implement a navigation maneuver.

14. The navigation system according to claim 13, wherein at least one said sensor is an inertial measurement unit.

* * * * *